United States Patent [19]
Johnson et al.

[11] Patent Number: 6,147,966
[45] Date of Patent: Nov. 14, 2000

[54] ROUTE FINDING IN COMMUNICATIONS NETWORKS

[75] Inventors: David Johnson, Suffolk, United Kingdom; Raymond Soo Khiaw Chng, Singapore, Singapore

[73] Assignee: British Telecommunications public limited company, London, United Kingdom

[21] Appl. No.: 09/011,028

[22] PCT Filed: Aug. 6, 1996

[86] PCT No.: PCT/GB96/01912

§ 371 Date: Feb. 23, 1998

§ 102(e) Date: Feb. 23, 1998

[87] PCT Pub. No.: WO97/06643

PCT Pub. Date: Feb. 20, 1997

[30] Foreign Application Priority Data

Aug. 7, 1995 [EP] European Pat. Off. ............. 95305495

[51] Int. Cl.[7] .......................... G06F 11/00; G06F 15/173
[52] U.S. Cl. ........................ 370/221; 370/225; 370/228; 370/249; 709/239
[58] Field of Search .................................. 370/216, 220, 370/221, 222, 225, 228, 249; 340/825.01, 825.03, 826, 827; 709/238, 239, 242; 714/1–4; 379/271, 272, 273

[56] References Cited

U.S. PATENT DOCUMENTS

| | | | |
|---|---|---|---|
| 4,956,835 | 9/1990 | Grover | 370/228 |
| 5,065,399 | 11/1991 | Hasegawa et al. | 714/4 |
| 5,435,003 | 7/1995 | Chng et al. | 714/4 |
| 5,841,759 | 11/1998 | Russ et al. | 370/221 |
| 6,026,073 | 2/2000 | Brown et al. | 370/216 |

FOREIGN PATENT DOCUMENTS

| | | |
|---|---|---|
| 538 853 | 4/1993 | European Pat. Off. . |
| 0583135 A2 | 2/1994 | European Pat. Off. . |
| WO 97/23085 | 6/1997 | WIPO . |

OTHER PUBLICATIONS

IEEE Military Communications Conference, vol. 1, Oct. 15, 1989, Boston US, pp. 210–213, XP000130735 Corson et al: "A distributed routing algorithm for mobile radio networks" see p. 211, left–hand column, paragraph 1–paragraph 4.

Patent Abstracts of Japan vol. 17, No. 546 (P–1623), Sep. 30, 1993 & JP, A,05 151292 (Fujitsu), Jun. 18, 1993, see abstract.

*Primary Examiner*—Alpus H. Hsu
*Assistant Examiner*—Afsar M. Qureshi
*Attorney, Agent, or Firm*—Nixon & Vanderhye P.C.

[57] ABSTRACT

A method of determining a restoration route as in a fully or partially meshed communications network of nodes, comprising setting, at a slave end node for an existing route, a timeout for receiving a number of forward route-finder signatures from which it will select the signature representing the potential restoration route having the shortest length and return a route confirmation signature; switching, to act as master end node for the existing route and send reverse route-finder signatures to its neighbouring nodes; switching, upon receipt of a reverse route-finder signature at a master end node for an existing route, to act as slave end node, and send a corresponding return signature. Where a slave end node receives a backtrack signature indicating that the potential restoration route no longer has sufficient capacity, the node will switch to act as master end node. Where a forward route-finder signature is received after a node has sent a reverse route-finder signature, a priority route confirmation signature is sent. Where a node has sent a forward route-finder signature, received a reverse route-finder signature, sent a confirmation signature, and subsequently receives a priority confirmation signature, then unless a backtrack signature is received two restoration routes will be established and the nodes will select the better one.

11 Claims, 1 Drawing Sheet

ROUTE FINDING IN COMMUNICATIONS NETWORKS

BACKGROUND OF THE INVENTION

1. Field of the Invention

This invention relates to a method of finding, or determining, a route in a communication network; to a node arranged to perform the method; and to a network comprising such nodes. A route may be needed to replace an existing route which has failed, and such a route is referred to as a restoration route, or a route may be required to supplement an existing route which is becoming congested. As used herein, the term "additional route" embraces both restoration routes and supplementary routes.

2. Description of Related Art

It is known, for example from the article "The Self-Healing Network: A Fast Distributed Restoration Technique For Networks Using Digital Cross-Connect Machines", W. D. Grover, IEEE Globecom 87, and from U.S. Pat. No. 4,956,835 (Wayne D. Grover) to respond at the two nodes (known as failure nodes) connected to a failed span to receipt of a span failure alarm to initiate a real-time restoration process.

The failure nodes determine on the basis of their unique network identities (IDs) which node acts as Sender and which node acts as Chooser (also known as Master and Slave, respectively).

For each of the links of the failed span the Sender repeatedly transmits (floods) respective route-finder signatures to its neighbouring nodes (known as Tandem nodes) which forward flood the signatures to their neighbouring nodes. In one embodiment in the abovementioned US patent a node knows only its own identity (ID) and learns the ID of the node to which connectivity has been lost by reading the last valid contents of a receive signature register on the affected port(s) corresponding to the failed link(s), and in an alternative embodiment, a node stores and maintains a neighbour node ID table.

The node which decides to act as Chooser now enters a waiting state and remains in it until it receives a route-finder signature. Then it responds by transmitting a respective complementary reverse-linking signature (also known as a confirmation or return signature) to the Tandem node from which the route-finder signature was received. The confirmation signature travels back through the Tandem nodes establishing the required switch connections between node input and output ports, and eventually arrives at the Sender node, which then ceases transmitting the respective route-finder signatures, and proceeds to transmit on that newly established restoration route the traffic which would have been transmitted on the corresponding link of the failed span.

The abovementioned US patent also discloses that the restoration mechanism can be used for automatic provisioning of new circuit routes in a network by placing two nodes, between which it is desired to provision additional (i.e. Supplementary circuit routes, directly into Sender and Chooser states with regard to an artificial fault between the selected nodes. The nodes would be supplied with artificial fault information including the number of circuit routings that are being sought.

SUMMARY OF THE INVENTION

According to a first aspect of the present invention, there is provided a method of determining an additional route in a fully or partly meshed communications network of nodes, the method comprising the steps of:

determining in response to a first predetermined circumstance and in accordance with a respective predetermined master/slave relationship, at each of a pair of the nodes between which there is an existing route, the one node of said pair which is to act as master end node with respect to said existing route and the other node which is to act as slave end node;

sending from said one node to its neighbouring nodes a forward route-finder signature for said existing route;

receiving at a node a said forward route-finder signature, determining whether such receiving node is the slave end node for said existing route and, in the event that it is not, forwarding such received forward route-finder signature to its neighbouring nodes;

determining at said other node in response to a second predetermined circumstance a potential additional route and sending from said other node on said potential additional route a route confirmation signature identifying said potential additional route; and storing details of said potential restoration route at said one node upon receipt thereat of the route confirmation signature;

and the method being characterised by the steps of:
responding at said other node to a third predetermined circumstance to switch to act as master end node;
sending from said other node to its neighbouring nodes a reverse route-finder signature for said existing route; and
responding at said one node to receipt thereat of said reverse route-finder signature to switch to act as slave end node for said existing route, to determine in response to a fourth predetermined circumstance a respective potential additional route, and to send a corresponding route confirmation signature.

Preferably, said first predetermined circumstance is the receipt of a predetermined message from an intermediate node of said existing route.

Preferably, said third predetermined circumstance is the receipt of a backtrack signature thereby indicating that there is insufficient capacity for said potential additional route at an intermediate node on said potential additional route.

Preferably, said second predetermined circumstance is the expiry of a predetermined timeout triggered by said first predetermined circumstance.

Preferably, said third predetermined circumstance is the absence of any received forward route-finder signatures at the expiry of said predetermined timeout of said second predetermined circumstance.

Said fourth predetermined circumstance may be the receipt of said reverse route-finder signature.

Alternatively, said fourth predetermined circumstance may be the expiry of a predetermined timeout triggered by the receipt of said reverse route-finder signature.

Preferably, there is included the step of responding at said one node, when acting as slave end node and having sent said corresponding route confirmation signature, to receipt of a corresponding backtrack signature thereby indicating that there is insufficient capacity for said respective potential additional route at an intermediate node thereof, to switch back to act as master end node for said existing route and to send a respective forward route-finder signature.

Preferably, route-finder signatures comprise a count field, and there is included the step of sending a forward route-finder signature from said one node comprises a substep of setting the respective count field to a first predetermined number of one parity on the first occasion that said one node sends a forward route-finder signature and setting the respective count field to the respective next successive number of said one parity on each successive occasion that said one node switches to act as master end node, and the step of sending said reverse route-finder signature from said other node comprises a substep of setting the respective count field to a first predetermined number of opposite parity on the first occasion that said other node sends a reverse route-finder signature and setting the respective count field to the respective next successive number of said other parity on each successive occasion that said other node switches to act as master end node.

According to a second aspect of the present invention, there is provided a node for use in a fully or partly meshed communications network of nodes, the node being arranged:

to respond, in use, to a first predetermined circumstance with respect to an existing route for which it is an end route to determine whether it will act as master end node or slave end node;

to send, in use, to its neighbouring nodes, in response to a determination that it will act as master end node, a forward route-finder signature;

to receive, in use, a route-finder signature and to determine whether or not it is an end node for the existing route identified by the route-finder signature, and, in response to a determination that it is not such an end node, to forward such received route-finder signature to its neighbouring nodes, or, in response to a determination that it is such an end node and subsequent to a preceding determination that the node is the slave end node for the existing route, to determine, in response to a second predetermined circumstance, a potential additional route, and to send on said potential additional route a route confirmation identifying the existing route; and to store, in use, details of a said potential additional route upon receipt thereat of a route confirmation signature for an existing route for which it is acting as master end node;

and characterised in that it is arranged:

to respond, when acting as slave end node, to a third predetermined circumstance to switch to act as master end node and to send a reverse route-finder signature for the existing route to its neighbouring nodes; and to respond, when acting as master end node, to receipt thereat of a said reverse route-finder signature for the existing route to switch to act as slave end node, to determine in response to a fourth predetermined circumstance a respective potential additional route, and to send a corresponding route confirmation signature on the respective potential additional route.

Preferably, the node is arranged to detect, in use, receipt of a predetermined message identifying an existing route for which the node is an end node, said receipt constituting said first predetermined circumstance.

The node may be arranged to detect, in use, receipt thereat of a backtrack signature for a said potential additional route for which the node is an end node, said receipt constituting said third predetermined circumstance.

Alternatively, the node may be arranged to trigger, when acting as slave end node, a predetermined timeout upon said first predetermined circumstance, the expiry of said predetermined timeout constituting said second predetermined circumstance.

Preferably, the node is arranged to switch, when acting as slave end node, to act as master end node in the absence of any received forward route-finder signatures at the expiry of said predetermined timeout, such absence constituting said third predetermined circumstance.

The node may be arranged to switch, when acting as master end node, to act as slave end node upon receipt thereat of a said reverse route-finder signature, such receipt constituting said fourth predetermined circumstance.

Preferably, the node is arranged to determine, when acting as master end node, said respective potential additional route, upon expiry of a predetermined timeout triggered by the receipt of a said reverse route-finder signature for the existing route, said expiry constituting said fourth predetermined circumstance.

More preferably, the node may be arranged to incorporate, in use, a count field in said route-finder signatures, and to set, when initially acting as master end node, the count field of a forward route-finder signature to a first predetermined number of one parity on the first occasion that the node sends a forward route-finder signature and to set the respective count field to the respective next successive number of said one parity on each successive occasion thereafter that the node switches to act as master end node, and also to set, when initially acting as slave end node, the count field of a reverse route finder-signature to a first predetermined number of opposite parity on the first occasion that the node sends a reverse route-finder signature and to set the respective count field to the respective next successive number of said other parity on each successive occasion thereafter that the node switches to act as master end node.

According to a third aspect of the present invention, there is provided a fully or partly meshed communications network of nodes, wherein the nodes are substantially identical and in accordance with the second aspect of the present invention.

BRIEF DESCRIPTION OF THE DRAWINGS

A specific embodiment of the present invention will now be described by way of example with reference to the drawing in which.

DETAILED DESCRIPTION OF EXEMPLARY EMBODIMENTS

Figure 1:
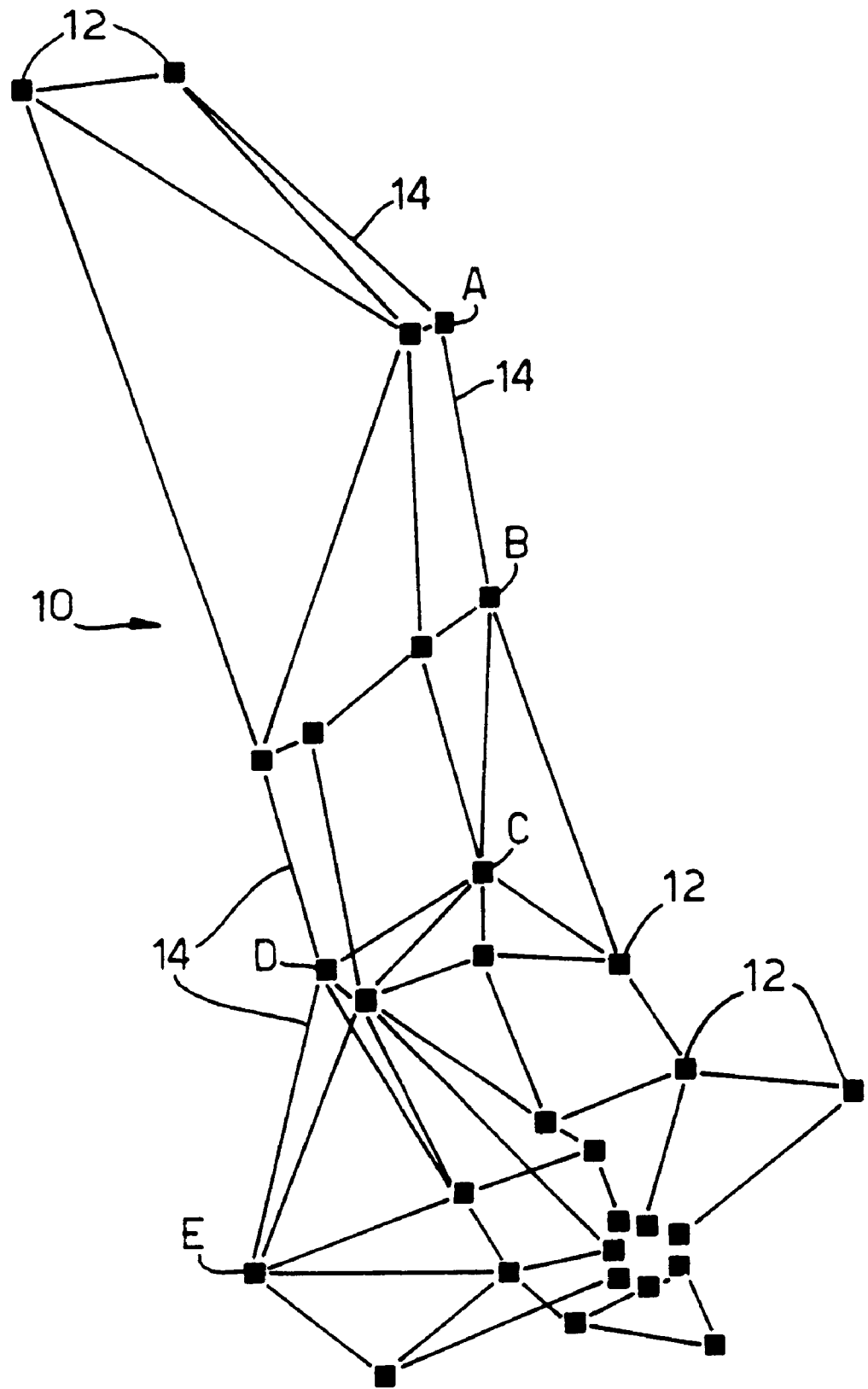
FIG. 1 is a diagram of a network of interconnected nodes.

The specific embodiment of the present invention relates to a real-time restoration process for establishing a restoration route in a communications network and the following description will be limited to this although it will be appreciated that such a process need not be the sole restoration process in a network but can be combined with a pre-planned restoration process.

Consider a route through network 10 between end nodes A and E, passing through intermediate nodes B, C and D, and comprising a sequence of bidirectional links within spans AB, BC, CD, and DE, and let this route have the unique route ID "X". The spans between the nodes comprise working links and spare links, and each working link is part of a respective unique route.

Consider also that an excavator has severed the span CD and that the nodes; C and D, the failure nodes, upon detecting the failure of span CD, have decided that a restoration route is to be found between nodes A and E. This decision may be based on one or more criteria, for example the use of a potential link restoration (bypass) solution between the failure nodes would result in the overall route length (total number of spans) exceeding a predetermined limit. Such criteria are not part of the present invention and will not be further described.

The failure nodes will, correspondingly, act to find a respective restoration route, for each of the other routes which use links of the span CD. The order in which these restoration routes are established may be predetermined by ranking the routes in priority order, but such ranking is not part of the present invention and will not be described.

The failure nodes will as the result of the abovementioned decision generate a respective help signature (referred to herein as a help message) for the route X, and for any other route affected by the failure of span CD, and send these help messages to the respective end nodes of the routes. In variants, if more than one route is affected, a single help message is used containing the route IDs of all the affected routes.

Each of the various signatures used in the restoration process has a header and a trailer, the header including a four bit signature type field. The various types, as will be described in more detail later, are normal route-finder (also known as forward route-finder), reverse route-finder (also known as backward route-finder), route-tracer, alarm, help, backtrack, return (also known as confirmation), and priority return. The information section of a signature comprises a four bit flood count field, an *eight bit* accumulated route length field, a four bit hop court field, a four bit route ID count field, one or more sixteen bit route ID fields, and a corresponding number of eight bit circuit number fields.

As the help messages pass through their respective intermediate nodes they break down connections in the corresponding failed route. Each node will forward a received help message on the link which corresponds to the route ID contained in the help message.

Thus, node C, having determined that it is experiencing a failure of route X, sends a help message to node B, because it knows that span CB contains the outgoing link for route X, and, similarly, node D sends a help message to node E. These help messages contain in respective route ID fields the unique ID of the failed route, and of any other route having a circuit in the failed span CD.

Each node knows its own network ID and contains a table storing the route IDs for which it is an end node, and the network IDs of the other end nodes.

When node B receives the help message, it will check its stored table to find out whether it is an end node for the identified route, and where, as in this case, it is not an end node, it will transmit the help message on the outgoing link associated with that route (a link of the span BA), and break down the connection for that route by removing the route and link data from its connection table.

When node A receives the help message, it will determine that it is an end node for the route X, and proceed to determine whether it is higher-ranking or lower-ranking relative to the stored ID of the other end node (E) for that route, based on the unique network IDs (ordinal numbers) of the nodes. If the former, then it will act as a master node (also known as a sender node), and if the latter then it will act as a slave node (also known as a chooser node), and in this example node A has a higher-ranking network ID than node E, and thus on receipt of the, help message will, for establishing a restoration route for route X, assume the role of master.

Similarly, when node E receives the respective help message, it will determine that it is an end node for the route X, and proceed to determine whether it is higher-ranking or lower-ranking relative to the stored ID of the other end node (A) for that route. In this example node E has a lower-ranking network ID than node A, and thus on receipt of the help message will, for establishing a restoration route for route X, assume the role of slave.

Node A now broadcasts for the failed route X a route-finder signature which floods through the network. This signature contains the ID of the route X, the requested capacity for the route, and has its flood count field set to one. As the signature floods through the network, the forwarding or relaying nodes increment the hop count field, and update the accumulated route length field by the length of the span on which the signature was received. In variants, this latter field is updated by the length of the span on which the signature is to be forwarded.

The relaying nodes forward the signature on only those spans which can provide the requested capacity (i.e. have a sufficient number of spare circuits), but they do not mark that capacity as reserved. Also, they check the hop count of a received signature and take no action if the count is greater than a predetermined maximum. This sets a limit to the geographical extent of flooding. In variants, flooding control additionally or alternatively comprises checking a time of origin field in the signature and taking no action if the signature is older than a predetermined limit, or checking the accumulated route length field and taking no action if the accumulated route length is greater than a predetermined limit, or any combination of these control mechanisms.

The master node A, when it has broadcast the route-finder signature, will, enter a quiescent state to await receipt of a return signature.

Upon node E determining that it is to act as slave for the failed route X, it starts (triggers) a timeout to await receipt of corresponding route-finder signatures containing the same route ID as in the help message. Each such signature received within the timeout period is stored.

At timeout the slave node E selects from all received route-finder signatures for the failed route X, the optimum restoration route, for example that having lowest hop count or lowest route length, and sends a return signature (also called a route confirmation signature) back via the node from which the selected route-finder signature was received. This return signature is identical to the route-finder signature except that the content of the signature type field is changed to identify the signature as a return signature travelling towards the master node A, but in variants node E additionally deletes any route ID and associated required capacity other than that for route X.

As the return signature passes through the nodes of the selected restoration route, each of these nodes checks that the requested capacity is still available, makes the connection between the corresponding switch ports, creates an eight bit node ID field and writes its node ID into this field so that the master node A can know all the nodes of the route.

Upon receipt of the return signature, the master node A knows that a restoration route now exists, as identified by the intermediate or relaying node IDs in the signature, and now sends a route-tracer signature to node E, via the restoration route, to inform it of the intermediate nodes of the restoration route and then proceed with traffic transmission. Where the invention is used to find a supplementary route, the route-tracer signature can be sent on the existing route. This use of a route-tracer signature is known in the art and does not form part of the present invention.

It may be that, although a relaying node had sufficient capacity and was able to forward the route-finder signature, this capacity has been taken by establishment of another restoration route before receipt of the corresponding return signature. In this event the relaying node sends to the slave node E a backtrack signature which breaks down any connections already made at intermediate nodes on that route and indicates to the slave node E that the selected restoration route is no longer available.

On receipt of such a backtrack signature, the slave node E changes to act as a master node for that route, generates a route-finder signature with its flood court field set to two and sends it to its neighbouring nodes. This signature is also referred to as a reverse route-finder signature. It will be appreciated that signatures with odd flood counts can be identified as successive attempts made by the original master to find a restoration route, and that signatures with even flood counts can be correspondingly identified as successive attempts made by the original slave.

The first receipt at the master node A of a reverse route-finder signature for the route X causes node A to change from acting as a master node to acting as a slave node for that route.

The node A, now acting as a slave node, responds by immediately sending a return signature on the link on which the reverse route-finder signature was received. This signature has the appropriate code for a return signature in its signature type field, and also has its flood count field set to two. In variants, the master node A starts a timeout in response to receipt of a reverse route-finder signature, stores all reverse route-finder signatures received within the timeout period, and selects the optimum restoration route at the end of the timeout period.

The slave node E is arranged to switch to act as a master node if no route-finder signatures have been received by the end of its timeout period. If a route-finder signature is subsequently received after the node E has switched to act as a master, the node E will still act as a slave for that route-finder signature and send a priority return signature having a flood count of one. As this signature travels back along the corresponding restoration route, it is recognised by the intermediate node as requiring priority handling and placed at the front of any queue of signatures awaiting processing. In this way the restoration route will be established with minimum delay and it is likely that such a priority return signature will overtake the reverse route-finder signature. In this case the master node A will respond normally, but will know by the signature type that the node E has changed roles from slave to master and has sent a reverse route-finder signature to its neighbouring nodes. Node A will thus expect to receive reverse route-finder signatures, but these are redundant and can be ignored.

The node E, acting as a master and having sent out reverse route-finder signatures, and possibly also acting as slave and having sent a priority return signature, will now be in a waiting state. If there is insufficient capacity on the restoration route for the priority return signature to go all the way to the end node A, a backtrack message will be sent from the appropriate blocking node and on receipt at the node E (now acting as a master) will be ignored since node E has already sent out reverse route-finder signatures, and node E will continue to wait for a reverse return signature from the other end node A.

In the case where a priority return signature does not overtake flooding reverse route-finder signatures, the node A will act as a slave node upon first receipt of a reverse route-finder signature of flood count two, send back a reverse return signature (also of flood count two) and then subsequently receive the priority return signature and simultaneously act as a master node for this signature. If the reverse return signature does not go through and a backtrack message is returned to node A, then no further action is necessary since there is in existence an established restoration route. If, on the other hand, the reverse return signature is received at the slave node E (acting as a master node), then a corresponding restoration route is thus established. Subsequently, both end nodes A and E will become aware, by means of further messages which identify the nodes of the routes that there are two restoration routes and one of end nodes A and E (the original master node A, say) will decide which route to break down and will take suitable action.

If the master node A does not receive within a timeout a return signature or a reverse route-finder signature, it will send another forward route-finder signature, this time with the flood count field incremented by two. Similarly, the slave node E, if it does not receive within a respective timeout from switching to act as master a return signature or a forward route-finder signature, it will send another reverse route-finder signature with its flood count field incremented by two. This process can be terminated at a predetermined time at which it is deemed unlikely that a restoration or an additional route can be found.

The abovedescribed method of finding a restoration route in a network can be used to find a supplementary route by sending instructions from a network control centre to the two end nodes of a congested route so that they treat the congested route as failed and initiate the method of the invention to find an additional route (also known as an alternative route) between the two end nodes.

What is claimed is:

1. A method of determining an additional route in a fully or partly meshed communications network of nodes, the method comprising the steps of:

determining in accordance with a respective predetermined master/slave relationship, at each of a pair of the nodes, between which pair there is an existing route, the one node of said pair which is to act as master end node with respect to said existing route and the other node which is to act as slave end node, said determining step being initiated in response to receipt, at each of said pair of nodes, of a signal indicating that an additional route is required in respect of said existing route;

sending from said one node to its neighbouring nodes a forward route-finder signature for said existing route;

receiving at a node a said forward route-finder signature, determining whether such receiving node is the slave end node for said existing route and, in the event that it is not, forwarding such received forward route-finder signature to its neighbouring nodes;

determining at said other node, upon the expiry of a predetermined timeout triggered by receipt of-said signal, a potential additional route and sending from said other node on said potential additional route a route confirmation signature identifying said potential additional route; and storing details of said potential additional route at said one node upon receipt thereat of the route confirmation signature;

and the method being characterised by the steps of:

responding at said other node, in the event that at said timeout a potential additional route has not been determined, and in the event that said other node has sent a said route confirmation signature but has received a backtrack signature indicative of insufficient capacity for said potential additional route at an intermediate node on said potential additional route, by switching to act as master end node with respect to said existing route;

sending from said other node to its neighbouring nodes a reverse route-finder signature for said existing route; and responding at said one node to receipt thereat of said reverse route-finder signature to switch to act as slave end node with respect to said existing route, to determine a respective potential additional route, and to send a corresponding route confirmation signature.

2. A method as claimed in claim 1, wherein said one node determines said respective potential additional route upon receipt of said reverse route-finder signature.

3. A method as claimed in claim 1, wherein said one node determines said respective potential additional route upon the expiry of a predetermined timeout triggered by the receipt of said reverse route-finder signature.

4. A method as claimed in claim 1, wherein said signal indicating that an additional route is required in respect of said existing route is received from an intermediate node of said existing route.

5. A method as claimed in claim 1, including the step of responding at said one node, when acting as slave end node and having sent said corresponding route confirmation signature, to receipt of a corresponding backtrack signature indicative of insufficient capacity for said respective potential additional route at an intermediate node thereof, to switch back to act as master end node for said existing route and to send a respective forward route-finder signature.

6. A method as claimed in claim 1, wherein route-finder signatures comprise a count field, and wherein the step of sending a forward route-finder signature from said one node comprises a substep of setting the respective count field to a first predetermined number of one parity on the first occasion that said one node sends a forward route-finder signature and setting the respective count field to the respective next successive number of said one parity on each successive occasion that said one node switches to act as master end node, and the step of sending said reverse route-finder signature from said other node comprises a substep of setting the respective count field to a first predetermined number of opposite parity on the first occasion that said other node sends a reverse route-finder signature and setting the respective count field to the respective next successive number of said other parity on each successive occasion that said other node switches to act as master end node.

7. A node for use in a fully or partly meshed communications network of nodes, the node being arranged: to respond, in use, to receipt of a signal indicative of a requirement for an additional route in respect of an existing route for which it is an end route to determine whether it will act as master end node or slave end node;

to send, in use, to its neighbouring nodes, in response to a determination that it will act as master end node, a forward route-finder signature for said existing route;

to receive, in use, a route-finder signature and to determine whether or not it is an end node for an existing route identified by the route-finder signature, and, in response to a determination that it is not such an end node, to forward such received route-finder signature to its neighbouring nodes, and, in response to a determination that it is such an end node and subsequent to a preceding determination that the node is the slave end node for the existing route identified by the route-finder signature, to determine, upon expiry of a predetermined timeout triggered by receipt of said signal, a potential additional route for the existing route identified by the route-finder signature, and to send on said potential additional route a route confirmation signature for the existing route identified by the route-finder signature; and to store, in use, details of a said potential additional route upon receipt thereat of a route confirmation signature for an existing route for which it is acting as master end node;

and characterised in that it is arranged:

to respond, when acting as slave end node, to expiry of said predetermined timeout in the absence of a determination of a said potential additional route, and to receipt of a backtrack signature indicative of insufficient capacity for said potential additional route at an intermediate node on said potential additional route, to switch to act as master end node with respect to the existing route identified by the route-finder signature and to send a reverse route-finder signature for that existing route to its neighbouring nodes; and to respond, when acting as master end node with respect to said existing route, to receipt thereat of a said reverse route-finder signature for that existing route to switch to act as slave end node with respect to that existing route, to determine a respective potential additional route, and to send a corresponding route confirmation signature on said respective potential additional route.

8. A node as claimed in claim 7, and arranged to determine said respective potential additional route upon receipt of said reverse route-finder signature.

9. A node as claimed in claim 7, and arranged to determine said respective potential additional route upon the expiry of a predetermined timeout triggered by the receipt of said reverse route-finder signature.

10. A node as claimed in 7, arranged to incorporate, in use, a count field in said route-finder signatures, and arranged (a) to set, when initially acting as master end node,
   (i) the count field of a forward route-finder signature to a first predetermined number of one parity on the first occasion that the node sends a forward route-finder signature for a said existing route and
   (ii) the respective count field to the respective next successive number of said one parity on each successive occasion thereafter that the node switches to act as master end node for that existing route, and also (b) to set, when initially acting as slave end node,
   (i) the count field of a reverse route finder-signature to a first predetermined number of opposite parity on the first occasion that the node sends a reverse route-finder signature for a said existing route, and
   (ii) the respective count field to the respective next successive number of said other parity on each successive occasion thereafter that the node switches to act as master end node for that existing route.

11. A fully or partly meshed communication network of nodes, wherein the nodes are identical and as claimed in claim 7.

* * * * *